Jan. 24, 1939.  R. P. MILLER  2,144,848
CUSHION SUPPORT
Filed June 8, 1935  2 Sheets-Sheet 1

INVENTOR.
ROBERT P. MILLER
BY W. H. Beatty
ATTORNEY.

Jan. 24, 1939.  R. P. MILLER  2,144,848
CUSHION SUPPORT
Filed June 8, 1935   2 Sheets-Sheet 2
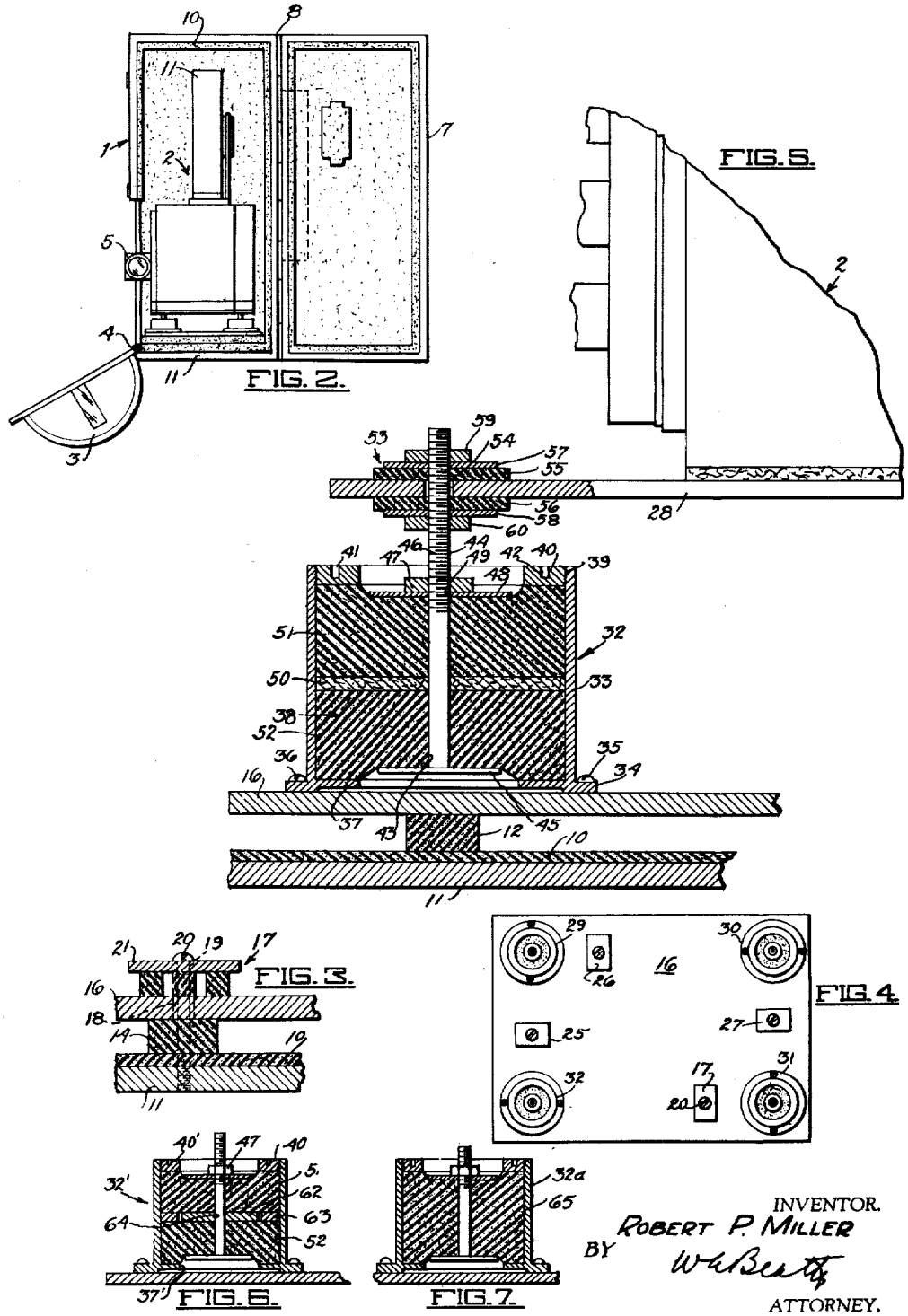
INVENTOR.
ROBERT P. MILLER
BY W. H. Beatty
ATTORNEY.

Patented Jan. 24, 1939

2,144,848

UNITED STATES PATENT OFFICE 2,144,848

CUSHION SUPPORT

Robert P. Miller, Burbank, Calif., assignor to United Research Corporation, Long Island City, N. Y., a corporation of Delaware Application June 8, 1935, Serial No. 25,622

5 Claims. (Cl. 248—22)

This invention relates to vibration dampers and although it is described and shown in connection with a moving picture camera, it is to be understood that the invention is also equally applicable to other machinery or structures where vibration absorption is desirable.

In taking sound motion pictures, it is customary to mount the camera within a sound-proof casing or "blimp" to prevent noise from the various parts of the camera from reaching the recording microphone. Due to the motor, intermittent film feed mechanism, etc., certain vibrations are set up within the camera, which vibrations, if not properly absorbed within the camera mounting, will be transmitted to the walls of the blimp and thus cause compressional sound waves to be set up and transmitted to the microphones.

Heretofore, vibration dampers or insulators of the shear type have comprised rubber elements bonded to both the supported and supporting bodies in such a manner that the load is applied to the rubber in shear. The disadvantage of this type of mounting is that there is no way to adjust the natural vibrating body which it supports in case the latter produces a periodic vibration. Also, there is no way of readjusting the mounting due to the sagging of the rubber after long use.

The present invention is adapted for use in connection with vibrating elements, such as motors, motion picture camera, etc., which produce a periodic vibration of a certain frequency. It is especially useful in supporting motion picture cameras in blimps. Due to the fact that different cameras, each having a different frequency vibration, may be placed within the blimp, it is desirable to provide means for adjusting the natural frequency of the mounting to prevent synchronism with any particular camera used.

One object of the invention is to absorb vibrations within the mounting of a vibratory structure.

This is accomplished by providing a resilient material such as sponge rubber within a constricting shell. The load is carried by shearing action of the resilient material, which has been found to be the most effective way of developing the elastic properties of the material.

Another object of the invention is to adjustably change the vibration frequency of a vibration damper.

This is accomplished by subjecting the resilient material to a variable amount of compression so as to change its stiffness and consequently its vibration characteristic, when acted upon in shear. This feature also permits readjustment of the damper necessitated by sagging of the resilient material after long use.

For further details of the invention, reference may be had to the accompanying drawings wherein:

Fig. 2 is a rear elevation view of the camera blimp with the vibration damping mountings in position.

Fig. 3 is a detailed view of a resilient mounting employed between the base of the "blimp" and the vibration damper supporting plate.

Fig. 4 is a reduced plan view through line 4—4 of Fig. 1 illustrating the arrangement of the various vibration dampers, etc.

Fig. 5 is an enlarged elevation view in section of camera mounting embodying the present invention.

Fig. 6 is a sectional view of a modified form of vibration damper.

Fig. 7 is a sectional view of another form of vibration damper in which no stiffening means is employed within the resilient material.

Figure 1:
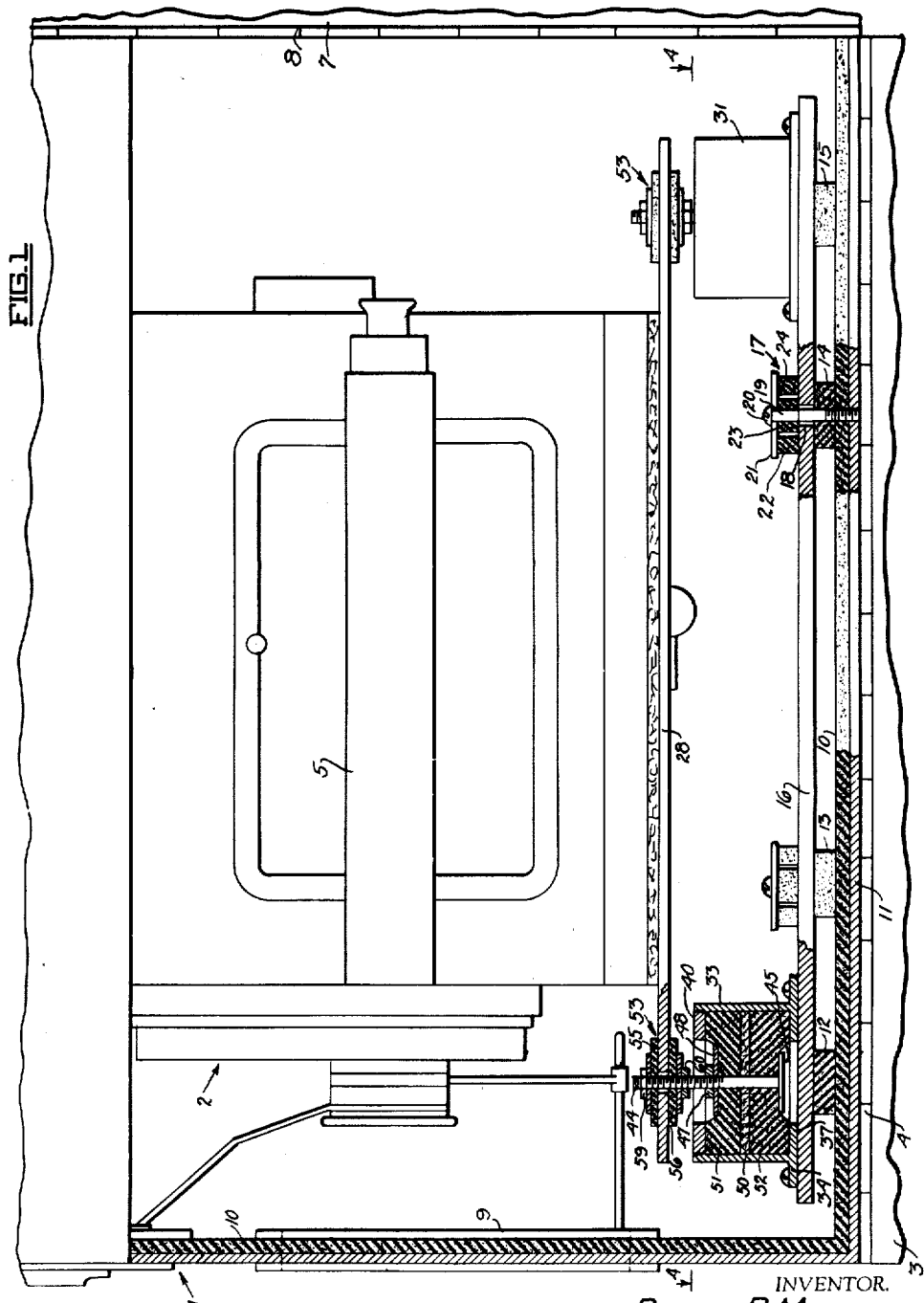
Fig. 1 is a side elevation view of a camera blimp and motion picture camera associated therewith which employs a preferred form of vibration damping mounting.

Referring now to Figs. 1 and 2, a sound-proof casing or blimp generally indicated at 1 is provided having a motion picture camera 2 mounted therein. A door 3 on the side of the blimp 1 is hinged at 4 and allows access to the camera 1 when open and accommodates a viewfinder 5 on the camera 2 when in closed position. A door 7, shown in an open position in Fig. 2, is provided at the rear of the blimp 1 and is hinged at 8 to permit access to the film magazine 11 of the camera 2. The entire inner surface of the blimp 1, except for the photographing aperture 9 and a pair of viewfinding apertures (not shown) is lined with a sound absorbing material 10 such as sponge rubber or felt to prevent noise produced by the various mechanisms of the camera 2 from being transmitted through the walls of the blimp. The photographing and viewfinding apertures are provided with glass panes (not shown) to sufficiently insulate the sound at those points.

I will now describe the means for resiliently supporting the camera 2 upon the base 11 of the blimp 1. A plurality of thick strips 12, 13, 14 and 15 of resilient material, such as sponge rubber, are laid upon the base 11 and support a metal plate 16. In order to fasten the plate 16 upon the strips 12, 13, 14 and 15, fastening means, generally indicated at 17, are provided (see Figs. 1 and 3). The plate 16 is provided with an enlarged opening 18 thereon through which is mounted a bolt 19. The head 20 of the bolt 19 engages a stiff metal plate 21 which rests on resilient insulators 22, 23 and 24 of sponge rubber or the like. The bolt 19 projects through an aperture in one of the supporting strips 14 and is threadedly secured in the base 11. As shown in Fig. 4, securing means, 25, 26, and 27 are provided which are similar to fastener 17. Thus it will be seen that the plate 16 is resiliently mounted to the base 11 and that there is no metallic connection between the two.

Referring now to Figs. 1, 4 and 5, the camera is mounted in any suitable manner upon a camera plate 28. The plate 28, in turn, is mounted, through vibration dampers 29, 30, 31 and 32 adjacent each of its corners, to the plate 16.

The following description of one of the vibration dampers 32 (Fig. 5) applies equally well to the other three dampers. The damper 32 comprises an annular shell 33 which is provided at its lower end with an outwardly extending flange 34 to provide a base for the damper 32. Screws 35 and 36 secure the flange 34 upon the upper surface of the plate 16. An inwardly extending flange 37 near the lower end of the shell 33 forms a shelf on which is seated a resilient material 38 as sponge rubber. The inner surface of the shell 33 adjacent its upper end is threaded at 39 to receive an annular retainer ring 40 so as to form an inwardly extending flange. Holes 41 and 42 are provided in the ring 40 to allow the use of a suitable tool to remove it. An aperture 43 is provided in the center of the rubber 38 and is adapted to receive a rod 44 which has a stiff metal disc or head 45 attached to its lower end. The upper end of the rod 44 is provided with threads 46 on which is threadably mounted an adjusting nut 47. Between the nut 47 and the upper surface of the rubber 38 is a stiff metal disc or head 48 similar in size to the disc 45 and has a hole 49 therein to receive the rod 44.

As was stated before, one purpose of the invention is to adjustably control the natural frequency of the vibration damper. This is accomplished by adjusting the nut 47 which varies the compression or density of the rubber 38 within the shell 33. The ring 40 may also be adjusted to vary the density of the rubber 38 or both the ring 40 and the nut 47 may be adjusted simultaneously. By changing the compression of the rubber, its stiffness, and consequently, its natural frequency, will also be changed.

In order to prevent undue sagging of the resilient material 38, one or more discs 50 of relatively stiff material such as cork or leather may be interposed between layers 51 and 52 of the material 38.

The camera plate 28 is mounted on the rods 44 of the vibration dampers through adjustable connections generally indicated at 53. An enlarged aperture 54 is provided in the camera plate 28 through which is mounted the rod 44. Discs of resilient material as sponge rubber 55 and 56 are placed on either side of the plate 28 in alignment with the aperture 54 and have stiff metal plates 57 and 58 provided on the outer surfaces thereof. Nuts 59 and 60 engage the plates 57 and 58 respectively. Thus it will be seen that there is no metallic connection between the camera plate 28 and the rod 44. In case the rubber material 38 in the vibration damper 32, or any of the strips 12, 13, 14 and 15 should sag during use, the nuts 59 and 60 may be adjusted to align the camera 2 properly within the blimp 1.

In the form shown in Fig. 6, a disc 62 and ring 63 are provided between the two sections 51' and 52' of the damper 32'. Ring 63 is slidably mounted within the shell 38 and receives within its annulus the disc 62. A hole 64 within the center of the disc 62 allows the latter to slide freely along the rod 44. The inside diameter of the ring 63 is preferably of the same dimensions as the inside diameters of the flange 37' and the retainer ring 40'. Thus it will be seen that the outside edge of the disc 62 and inside edge of ring 63 will tend to keep the line of shear in the same direction as that of the applied load.

In Fig. 7 no stiffening means is employed within the resilient material 65 of the damper 32a.

In adjusting the various dampers, the nuts 47 and retainer rings 40 are screwed down sufficiently to damp out the vibrations produced in the camera and at the same time care is taken to prevent the rubber from being compressed so as to become so stiff that the vibrations of the camera will be transmitted therethrough to the base of the blimp.

A further feature of the invention lies in the fact that the sponge rubber is practically enclosed from the atmosphere. It is known that air tends to dry up the chemicals mixed in the rubber and thus in time cause the rubber to lose its elasticity and become brittle unless enclosed from contact with the air.

By providing the resilient support with rubber in shear plus rubber in compression through the shear dampers 32 and strips 12, the advantageous qualities of each are combined. Any vibrations which may possibly be transmitted by the dampers 32 could be absorbed through the strips 12.

Having thus described the invention, what is claimed as new and desired to secure by Letters Patent, is:

1. In a vibration support, a shell, an inwardly extending flange adjacent one end of said shell, an adjustable retainer ring adjacent the opposite end of said shell, a rubber body supported between said flange and said retainer ring, a load supporting rod extending through said rubber body, heads on said rod at either end of said rubber body adjacent said flange and said ring, said body being under stress, a ring intermediate the ends of said rubber body, a disc positioned within the inner circumference of said ring and means for adjusting said heads relative to each other whereby the elasticity of said body may be varied.

2. In a resilient support the combination of a wall member, a resilient body supported by said wall member, a load supporting member carried by said resilient body whereby the principal stress created by said load supporting member is carried through the shear action of said resilient body, and a plurality of free floating stiffening members in a common plane interposed within said resilient body.

3. A resilient support comprising an enclosing wall member, inwardly extending flanges on said wall member, said flanges having substantially the same inside dimensions, a rubber body mounted between said flanges, a load supporting rod extending through said rubber body, heads on said rod at either end of said rubber body adjacent said flanges, whereby the principal stress created by said load supporting rod is carried in shear by said rubber body, a ring interposed within said rubber body and having an internal dimension substantially the same as those of said flanges, and a disc within said ring having an external dimension substantially the same as those of said heads for controlling the line of shear through said body.

4. A resilient support comprising a shell member having inwardly extending flanges at each end thereof, a rubber body mounted within said shell and between said flanges, a rod extending through said body, means mounted on said rod lying substantially within the same planes as said flanges for exerting a shearing stress on said body, and means positioned within said body substantially midway between said flanges for controlling the line of shear in said body, one of said means encircling said rod and having an outside diameter comparable with the inside diameter of the remainder of said means.

5. A resilient support comprising the combination of a supporting member, said member having a supporting edge, a rubber body carried by said member and extending over said edge, a supported member carried by the extending portion of said body and having the supported edge thereof substantially in line with said supporting edge in the direction of the load produced by said supported member whereby said load is carried in shear by said body, a stiffening member in said body having an edge thereof substantially in line with said aligned edges of said supporting member and said supported member and a second stiffening member in said body and in the same plane as said first stiffening member, said second member having an edge substantially in line with said aligned edges of said supporting member and said supported member.

ROBERT P. MILLER.

CERTIFICATE OF CORRECTION.

Patent No. 2,144,848.                  January 24, 1939.

ROBERT P. MILLER.

It is hereby certified that error appears in the printed specification of the above numbered patent requiring correction as follows: Page 3, first column, lines 4 and 5, claim 3, strike out the words "for controlling the line of shear through said body" and insert the same after "body" and before the period on page 2, second column, line 64, claim 2; and that the said Letters Patent should be read with this correction therein that the same may conform to the record of the case in the Patent Office.

Signed and sealed this 25th day of July, A. D. 1939.

(Seal)                                                                   Henry Van Arsdale,
                                                                 Acting Commissioner of Patents.

substantially the same as those of said flanges, and a disc within said ring having an external dimension substantially the same as those of said heads for controlling the line of shear through said body.

4. A resilient support comprising a shell member having inwardly extending flanges at each end thereof, a rubber body mounted within said shell and between said flanges, a rod extending through said body, means mounted on said rod lying substantially within the same planes as said flanges for exerting a shearing stress on said body, and means positioned within said body substantially midway between said flanges for controlling the line of shear in said body, one of said means encircling said rod and having an outside diameter comparable with the inside diameter of the remainder of said means.

5. A resilient support comprising the combination of a supporting member, said member having a supporting edge, a rubber body carried by said member and extending over said edge, a supported member carried by the extending portion of said body and having the supported edge thereof substantially in line with said supporting edge in the direction of the load produced by said supported member whereby said load is carried in shear by said body, a stiffening member in said body having an edge thereof substantially in line with said aligned edges of said supporting member and said supported member and a second stiffening member in said body and in the same plane as said first stiffening member, said second member having an edge substantially in line with said aligned edges of said supporting member and said supported member.

ROBERT P. MILLER.

CERTIFICATE OF CORRECTION.

Patent No. 2,144,848.　　　　　　　　　　　January 24, 1939.

ROBERT P. MILLER.

It is hereby certified that error appears in the printed specification of the above numbered patent requiring correction as follows: Page 3, first column, lines 4 and 5, claim 3, strike out the words "for controlling the line of shear through said body" and insert the same after "body" and before the period on page 2, second column, line 64, claim 2; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.